(12) United States Patent
Small et al.

(10) Patent No.: US 11,816,501 B2
(45) Date of Patent: Nov. 14, 2023

(54) SYSTEM AND METHODS FOR MANAGING HIGH VOLUMES OF ALERTS

(71) Applicant: ZeroFOX, Inc., Baltimore, MD (US)

(72) Inventors: Samuel Kevin Small, Baltimore, MD (US); Steven Craig Hanna, Jr., Oakland, CA (US); Zachary Michael Allen, Baltimore, MD (US)

(73) Assignee: ZeroFOX, Inc., Baltimore, MD (US)

( * ) Notice: Subject to any disclaimer, the term of this patent is extended or adjusted under 35 U.S.C. 154(b) by 825 days.

(21) Appl. No.: 16/678,816

(22) Filed: Nov. 8, 2019

(65) Prior Publication Data

US 2021/0141666 A1    May 13, 2021

(51) Int. Cl.
| | |
|---|---|
| *G06F 9/48* | (2006.01) |
| *G06F 16/23* | (2019.01) |
| *G06N 20/00* | (2019.01) |
| *G06F 16/25* | (2019.01) |

(52) U.S. Cl.
CPC ........ *G06F 9/4881* (2013.01); *G06F 16/2379* (2019.01); *G06F 16/252* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 8,539,493 B1 * | 9/2013 | Robertson | G06F 9/4881 718/103 |
| 10,728,262 B1 * | 7/2020 | Vaswani | H04L 63/1416 |
| 10,917,739 B1 * | 2/2021 | McIntyre | H04W 12/64 |
| 2004/0204941 A1 * | 10/2004 | Israch | G10L 15/30 704/E15.047 |
| 2010/0058294 A1 * | 3/2010 | Best | G06F 11/3688 717/122 |
| 2012/0030678 A1 * | 2/2012 | Hayduchok | H04N 1/32122 718/101 |
| 2012/0254671 A1 * | 10/2012 | Francisco | H04L 41/069 714/48 |
| 2014/0201148 A1 * | 7/2014 | Doui | G06F 16/93 707/638 |
| 2015/0195165 A1 * | 7/2015 | Boger | G06F 11/0748 709/224 |
| 2015/0256277 A1 * | 9/2015 | Johnson | H04L 51/222 340/601 |
| 2015/0378722 A1 * | 12/2015 | Zuniga-Hernandez | G06F 8/71 717/103 |
| 2016/0323288 A1 * | 11/2016 | Peterson | H04L 63/102 |

(Continued)

*Primary Examiner* — Adam Lee
(74) *Attorney, Agent, or Firm* — DLA PIPER LLP (US)

(57) ABSTRACT

Systems and methods are described for managing high volumes of alerts to increase security, reduce noise, reduce duplication of work, and increase productivity of analysts dealing with and triaging alerts. A work unit queue may be configured to buffer or smooth workflows and decouple heavy processing which may improve performance and scalability to prevent duplicate assignments. Queueing services provide lag times to prevent over-assignment or double assignment of alerts to work units. System security may be improved by creating an authentication or verification step before allowing users to update alert statuses such that only users with work unit tokens that match alert tokens may update alert statuses.

20 Claims, 12 Drawing Sheets

(56) References Cited

U.S. PATENT DOCUMENTS

2018/0012463 A1* 1/2018 Chaudhry ............... G06T 7/246
2019/0243683 A1* 8/2019 Botelho ................. G06F 21/44
2021/0105267 A1* 4/2021 Brown ................ G06F 21/6218

* cited by examiner

FIG. 7

//MANAGED WORK STATUS — 1000

1001 → [Refresh Work Unit List]

| # | Work Unit | Creation Time | Creator | Strategy | Progress | Status | |
|---|---|---|---|---|---|---|---|
| 1 | Work Unit #18009 | 2 hours ago | J_smith@zerofox.com | severity | 85 of 100 done | ready | [Release Unit] |
| | ↙ 1002 | ↙ 1003 | ↙ 1004 | ↙ 1005 | ↙ 1006 | ↙ 1007 | ↙ 1008 |

ALERT CRITERIA | WORK CRITERIA | ALERTS | HISTORY | SETTINGS

FIG. 10

Work Unit #18009 ▼ 74% DONE

| | | | |
|---|---|---|---|
| ☆ | Company G Search Query<br>Profanity - Severe [ALERT ID] 65463313 | 5:33 AM | OPEN L |
| ☆ | Company G Search Query<br>WorkMark [ALERT ID] 65463391 | 5:35 AM | OPEN L |
| ☆ | Company H Search Query<br>Product Mention [ALERT ID] 65466748 | 7:09 AM | OPEN M |
| ☆ | Company A Search Query<br>GDPR - PII [ALERT ID] 65468952 | 8:08 AM | OPEN M |
| ☆ | Company B Search Query<br>Credit Card Numbers [ALERT ID] 65469244 | 8:14 AM | OPEN M |
| ☆ | Company C Incoming Post<br>SLC DLP [ALERT ID] 65469477 | 8:24 AM | OPEN M |
| ☆ | Company D Search Query<br>Company Mentions [ALERT ID] 65469857 | 8:29 AM | OPEN M |
| ☆ | Company D Search Query<br>Company Mentions [ALERT ID] 65469919 | 8:29 AM | OPEN M |
| ☆ | Company D Search Query<br>Company Mentions [ALERT ID] 65469920 | 8:29 AM | OPEN M | showing 13 of 98 alerts · fetched a day ago · ○ Refresh

---

OVERVIEW — SELECTED ALERTS

Applied Filters
Managed States: Taken | Alert States: Open | Clear All

Escalated Alerts
1. Unescalated Aler.... 87% 85
2. Escalated Alerts 13% 13

Alerts with Tags
1. Alerts without Ta.... 94% 92
2. Alerts without Tags 6% 6

Enterprises
Your alerts contain 31 unique ENTERPRISES.

| # | Company | % | Count |
|---|---|---|---|
| 1. | Company R | 12% | 12 |
| 2. | Company I | 11% | 11 |
| 3. | Company J | 10% | 10 |
| 4. | Company P | 6% | 6 |
| 5. | Company D | 6% | 6 |
| 6. | Company G | 5% | 5 |
| 7. | Company O | 5% | 5 |
| 8. | Company S | 5% | 5 |
| 9. | Company W | 4% | 4 |
| 10. | Company Y | 4% | 4 |

Reviewed Alerts
1. Reviewed Alerts 95% 93
2. Unreviewed Alerts 5% 5

Alerts with Notes
1. Alerts without N.... 99% 97
2. Alerts with Notes 1% 1

| # | Company | % | Count |
|---|---|---|---|
| 12. | Company TB | 3% | 3 |
| 13. | Company BC | 2% | 2 |
| 14. | Company SEE | 2% | 2 |
| 15. | Company A | 2% | 2 |
| 16. | Company AA | 2% | 2 |
| 17. | Company GP | 2% | 2 |
| 18. | Company SC | 1% | 1 |
| 19. | Company PJ | 1% | 1 |
| 20. | Company Z | 1% | 1 |
| 21. | Company B | 1% | 1 |

Alerts with Entity Labels
1. Alerts with Entity... 61% 60
2. Alerts without En... 39% 38

Alerts with Stars
1. Alerts without S.... 100% 98
2. Alerts with Stars 0% 0

| # | Company | % | Count |
|---|---|---|---|
| 23. | Company G | 1% | 1 |
| 24. | Company OQ | 1% | 1 |
| 25. | Company BV | 1% | 1 |
| 26. | Company DG | 1% | 1 |
| 27. | Company C | 1% | 1 |
| 28. | Company T | 1% | 1 |
| 29. | Company Q | 1% | 1 |
| 30. | Company H | 1% | 1 |
| 31. | Company N | 1% | 1 |

SYSTEM AND METHODS FOR MANAGING HIGH VOLUMES OF ALERTS

BACKGROUND

Because of the widespread interconnectedness in the modern era, a major focus of large companies, organizations, corporations, and/or enterprises is cyber security. Cyberattacks have the potential to inflict serious harm, considering the large amounts of personal and sensitive information companies have stored. A common cyber security technique is platform monitoring, monitoring large swaths of the online world in order to preemptively detect cyberattacks. In fact, many companies may even use this approach to monitor for real world attacks or important customer concerns.

Typical networks for monitoring include social media platforms, such as Twitter, Facebook, Reddit®, Google+, etc, email accounts within an organization, or domains. However, monitoring massive sources of data such as these poses problems for effectively detecting and dealing with detected events. Regardless of the criteria used to detect events (e.g. social media posts) and administer alerts based on these detections, there will inevitably be a massive number to deal with. A typical cyberattack workflow of a large company can have hundreds to thousands of alerts every day. It would be on the company's best interests if there was an effective way to manage high volumes of alerts to increase security, reduce noise, reduce duplication of work, and increase productivity of analysts dealing with and triaging these alerts.

SUMMARY OF THE INVENTION

Embodiments of the present disclosure relate to systems for managing a high volume workflow of tasks. According to one aspect of the present disclosure, the system may include a database configured to store a plurality of tasks, each task having a unique task ID, a date, a severity level, an enterprise ID, a status, and an assignment field; a user device; one or more processors; and a server. The server may be configured for execution by the one or more processors to receive a work unit request from the user device, the request comprising a strategy for selecting tasks; create a work unit, the work unit having a state indicator; assign a unique token ID to the work unit; select at least one task from the plurality of tasks in the database based on the strategy; add the task ID for the at least one selected task to the work unit to create a populated work unit; change the status of the at least one selected task to indicate the task is checked out; insert the token ID into the assignment field; send the populated work unit to the user device; and change the state indicator to indicate the work unit is checked out.

In some embodiments, the server may be configured to receive work unit requests from a plurality of user devices; create work units for the received work unit requests; queue the work units with a queueing service; populate a work unit after release from the queueing service; and send the populated work unit to a user device of the plurality of user devices. In some embodiments, the server may be configured to receive a plurality of tasks from a notification service; and store the received plurality of tasks in the database. In some embodiments, the server may be configured to authenticate a user associated with the user device prior to receiving the work unit request.

In some embodiments, the server may be configured to in response to changing the state indicator of a work unit to indicate the work unit is checked out, record a time of checking out; monitor a duration of time since the time of checking out; determine the duration of time has passed a threshold length; and in response to determining the duration of time has passed the threshold length, change the state indicator to indicate the work unit is checked in. In some embodiments, the server may be configured to, in response to determining the duration of time has passed a threshold length, change the status of the at least one selected task to indicate the at least one selected task is checked in.

In some embodiments, the server may be configured to receive a request to update the status of a checked out task from the user device; verify that the request includes a token ID corresponding to the assignment field of the checked out task; receive a new status from the user device; and update the status of the checked out task with the new status. In some embodiments, the system may include a first HTTPS connection between the user device and the server; and a second HTTPS connection between the server and the database. In some embodiments, the strategy for selecting tasks may include at least one of selecting based on the enterprise ID; selecting based on the date; selecting a pre-defined amount of tasks; selecting based on severity level; selecting based on a source of the task; selecting based on a rule type that created the task; or selecting based on a confidence level of a machine learning model that created the task.

In some embodiments, selecting at least one task form the plurality of tasks in the database may include selecting by at least one of enterprise ID or severity level; and adding the task IDs of the at least one selected task in an order sorted by date. In some embodiments, the server may be configured to ignore tasks in the database with a checked out status while populating the work unit.

According to another aspect of the disclosure, a method for managing a high volume workflow of tasks may include receiving, by a server, tasks from a notification service; storing, by the server, the tasks in a database, wherein each task has a unique task ID, a status, and an age; receiving, by the server, a first work unit request from a first user device, the request comprising a first strategy and a desired number of tasks; creating, by the server, a first work unit; generating a first unique token ID; assigning, by the server, the first unique token ID to the first work unit; selecting, by the server, the desired number of tasks from the database based on the first strategy and based on the age of tasks, wherein the selected tasks are the oldest tasks in the database that correspond to the first strategy; adding, by the server, the task ID of each task of the first plurality of tasks to the first work unit; sending, by the server, the first work unit to the first user device; and changing, by the server, the status of each task of the first plurality of tasks to indicate each task is checked out.

In some embodiments, the method may include receiving, by the server a second work unit request from a second user device, the request comprising a second strategy; creating, by the server, a second work unit; generating a second unique token ID; assigning, by the server, the second unique token ID to the second work unit; selecting, by the server, a second plurality of tasks from the database based on the second strategy, wherein the first and second plurality of tasks have no overlapping tasks; and adding, by the server, the task ID of each task of the second plurality of tasks to the second work unit. In some embodiments, the method may include sending, by the server, the second work unit to the second user device; and changing, by the server, the status of each task of the second plurality of tasks to indicate each task is checked out. In some embodiments, the method may include authenticating, by the server, a user of the user device prior to receiving the first work unit request.

According to another aspect of the present disclosure, a method for managing a workflow may include receiving, by a server, a plurality of work unit requests from a plurality of user devices, wherein each work unit request comprises a strategy; creating, by the server, a plurality of work units; generating, by the server, a unique token ID for each work unit; assigning, by the server, the unique token ID to the corresponding work unit; queueing, by a queueing service, the plurality of work units; in response to queueing the plurality of work units, selecting, one work unit at a time, by the server, a first plurality of alerts from a database of stored alerts by analyzing the database based on the strategy of the one work unit, wherein each stored alert comprises an alert ID; assigning, by the server, the alert ID of each selected alert to the one work unit; marking, by the server, each selected alert with the unique token ID of the one work unit; and sending the one work unit to the user device from where it was received.

In some embodiments, the method may include in response to marking each selected alert with the unique token ID of the one work unit, selecting, by the server, a second plurality of alerts for a subsequent work unit from the queueing service; assigning, by the server, the alert ID of each of the second plurality of alerts to the subsequent work unit; marking, by the server, each of the second plurality of alerts with the unique token ID of the subsequent work unit; and in response to receiving a query from a user device corresponding to the subsequent work unit, sending the subsequent work unit to the corresponding user device.

In some embodiments, the method may include causing, by the server, functionality to be displayed on the corresponding user device. The functionality may allow a user of the corresponding user device to view the alert IDs within the subsequent work unit; extract alerts from the database by alert ID; update a status of an alert within the subsequent work unit; and check in the subsequent work unit. In some embodiments, the functionality may allow the user of the corresponding device to view a confidence level of an alert within the subsequent work unit associated with a rule that triggered detection of the alert; and attach a tag to the alert. The tag may indicate at least one whether the confidence level surpasses a threshold confidence level; or whether the alert has a profile picture.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

FIG. 7 is an example graphical user interface showing a list of alerts within a work unit, according to some embodiments of the present disclosure.

FIG. 10 is an example graphical user interface showing work unit data, according to some embodiments of the present disclosure.

FIG. 11 is an example graphical user interface showing an overview of a work unit, according to some embodiments of the present disclosure.

FIG. 12 is an example graphical user interface showing a selected alert within a work unit, according to some embodiments of the present disclosure.

DETAILED DESCRIPTION OF SEVERAL EMBODIMENTS

Figure 1:
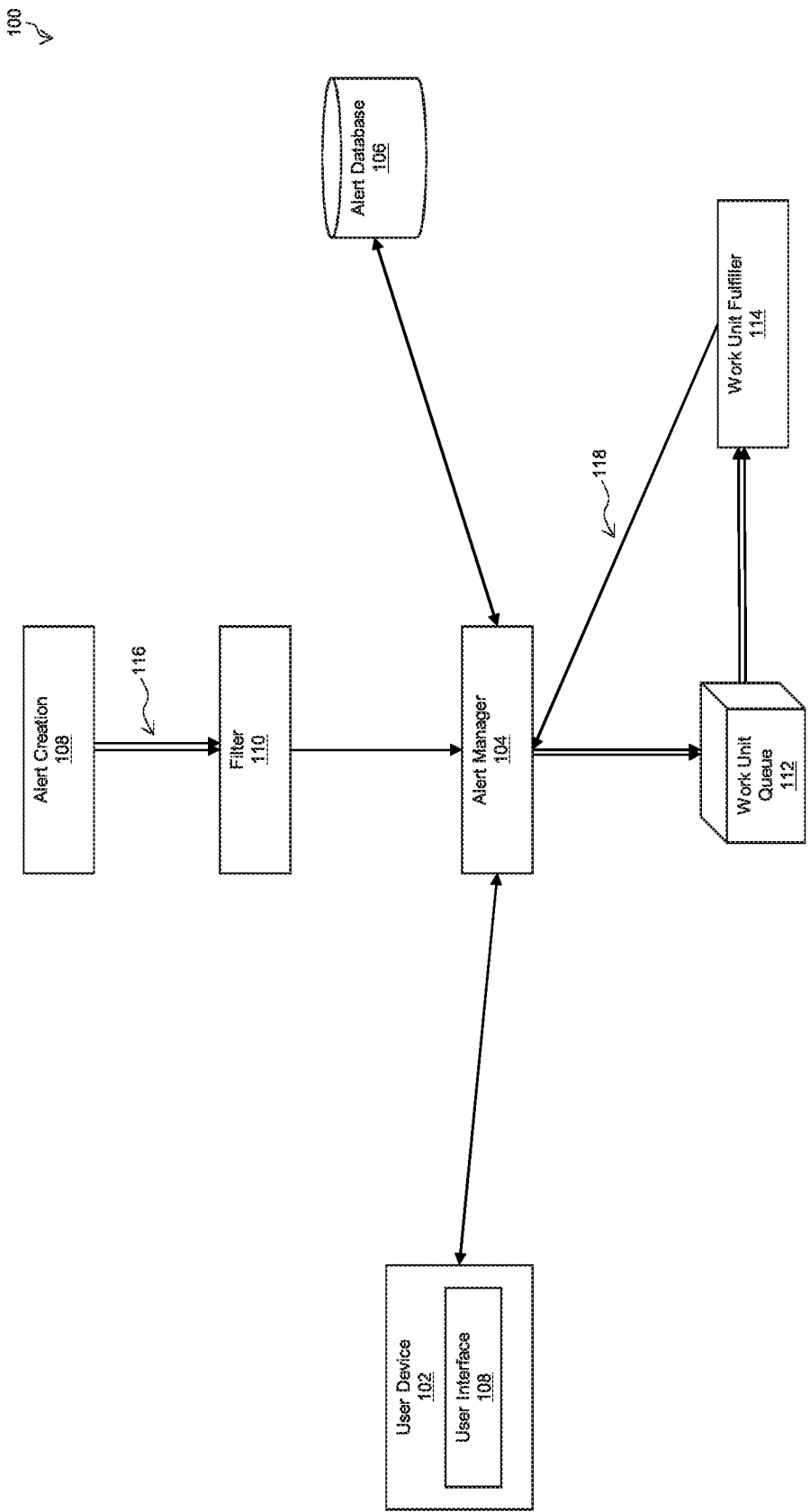
FIG. 1 is a block diagram of an example system for managing high volumes of alerts, according to some embodiments of the present disclosure.

The following detailed description is merely exemplary in nature and is not intended to limit the invention or the applications of its use.

Embodiments of the present disclosure are related to systems and methods for managing high volumes of alerts (i.e. tasks) and providing a simplified, secure, and organized framework for analysts to check out and complete work tasks or manage alerts. The architecture of the present disclosure may include a notification service that provides a stream of alerts. Alerts may be online events that have been detected based on some criteria (e.g. with trained machine learning algorithms) and then deemed to be dangerous or threatening enough to warrant an alert. For example, one hundred tweets may be detected based on mentioning the word "knife". These one hundred tweets would then be analyzed with machine learning algorithms to detect a danger or severity level; if one is found to have a knife with a threatening message within a certain proximity to a school, it may be turned into an alert on behalf of that school. The rest of the tweets may only have to do with cooking, and therefore would not warrant an alert. The alert (and all other alerts detected based on all possible criteria) would be sent to the notification service, and the notification service may provide a stream of these alerts to a team of analysts to manage or triage. In the context of the present disclosure, alerts may be generated on behalf of a large number of clients/enterprises, and whatever is detected to be dangerous for each client may be pushed by the notification service. The systems and methods of the present disclosure may allow a team of analysts to work on dealing with these alerts (escalating, finding false positives, sifting through noise, etc.) in an efficient and intelligent fashion. Analysts may use the system to create unique work units and the system may strategically assign alerts that need to be dealt with to these work units. This may help analysts, when provided with high volumes of alerts, to navigate their workflow with dynamic strategies that take into account factors including, but not limited to, criticality, the source of the alert, time sensitivity, data source, confidence level of detection, or social media network. The system may allow analysts to better understand the context of the most popular or most relevant alerts and help convey this understanding to the companies. More generally, an alert may be a task (i.e. some piece of work that needs to be completed).

The following description may serve as a non-limiting example of an alert workflow. Large companies may outsource their cybersecurity monitoring to third parties. Analysts at those third parties may be trained to handle a wide variety of alerts and detected events that have a high likelihood of being a threat. However, on a daily basis, they may receive alerts in need of attention on behalf of dozens or hundreds of different entities. For example, in a given day, there may be a list of three hundred alerts to address. Fifty may be on behalf of company A, thirty may be on behalf of company B, fourteen may be on behalf of company C, so on and so forth. The alerts may have different levels of criticality, may have originated from different sources, may have different ages, etc. The system of the present disclosure may provide a way for a team of analysts to manage high volumes of alerts in a more efficient manner. In other embodiments, there may be many thousands of alerts that need to be dealt with, or an amount great enough that it is difficult for a finite team of analysts to individually manage.

FIG. 1 is a block diagram of an example system 100 for managing high volumes of alerts, according to some embodiments of the present disclosure. System 100 may include a user device 102 communicably coupled to alert manager 104. Alert manager 104 may also be communicably coupled to alert creation module via filter 110, alert database 106, work unit queue 112 and work unit fulfiller 114. Work unit queue 112 may also be communicably coupled to work unit fulfiller 114. In some embodiments, at least one of alert manager 104, work unit queue 112, work unit fulfiller 114, and filter 110 may be components within a server device. In some embodiments, the server may be a virtual server. In some embodiments, the various components may be various API's and may be accessed via API endpoints.

The various components of system 100 may all be connected via a network. The network may include one or more wide areas networks (WANs), metropolitan area networks (MANs), local area networks (LANs), personal area networks (PANs), or any combination of these networks. Network 106 may include a combination of one or more types of networks, such as Internet, intranet, Ethernet, twisted-pair, coaxial cable, fiber optic, cellular, satellite, IEEE 801.11, terrestrial, and/or other types of wired or wireless networks. The network can also use standard communication technologies and/or protocols. Pathways 118 (single lines) may represent HTTP or HTTPS connection protocols for sharing information. Pathways 116 (double lines) may represent information being transmitted either by a notification service or a queueing service. In some embodiments, the notification service may be Amazon's Simple Notification Service (SNS). In some embodiments, the queueing service may be Amazon's Simple Queueing Service (SQS).

Alert creation module 108 may provide a stream of alerts via a notification service to alert manager 104. In some embodiments, this may be a Simple Notification Service from Amazon. In some embodiments, alerts originating from alert creation module 108 may also originate from a rule engine as described in "Methods and Systems for Enriching Data", application Ser. No. 16/670,081, filed on Oct. 31, 2019, which is hereby incorporated by reference in its entirety. In some embodiments, each alert (i.e. a dehydrated alert) may be a JSON object. The alert may include a unique alert ID (identifies the alert), an enterprise ID (identifies the company or entity that the alert is on behalf of), a rule ID (rationale or rule for why the alert was generated), policy ID (how an individual company chooses to configure rules to generate alerts on specific scenarios), network ID (identifies the source of the alert, such as Twitter, Facebook, email account, etc.), a severity level, etc. In some embodiments, a dehydrated alert may also include an associated error count. If the error count passes a certain threshold, alert manager 104 may remove the associated alert ID from scheduling and prevent it from being assigned to any work units. In some embodiments, the severity level may be a decimal or percentage. In some embodiments, the severity level may be a status of a hierarchy of five statuses (i.e. info, low, medium, high, and critical), although the hierarchy may include any number of levels. The alert may also include the actual event in a structured format (i.e. JSON), such as text from a tweet or Facebook post. In some embodiments, a filter 110 may be included to filter alerts provided by alert creation module 108 before they reach alert manager 104. For example, some alerts may be internal alerts or from companies that do not have or have not paid for access to alert management services; thus, their alerts do not need to be managed. In this case, filter 110 would filter alerts by enterprise ID. However, the filter 110 may filter alerts according to any number of criteria. In some embodiments, all alerts received by alert manager 104 may be stored in database 106. In some embodiments, alert manager 104 may store a list of the alert IDs of all alerts received. In some embodiments, examples of rules may be detection based on inclusion of sensitive data or personally identifiable information, identification of codewords, fraud scans, piracy scans, fraudulent job postings, fraudulent goods, impersonations, GDPR rule breaking, object detection, threats of violence, etc.

In some embodiments, an analyst may access the system 100 via a user interface 108 at user device 102. User device 102 may be a computer, laptop, or any other capable computing device. Examples of user interfaces on user device 102 are shown in FIGS. 7-12. In some embodiments, the API on user device 102 for interacting with alert manager 104 or the APIs may be an Angular application. In some embodiments, the front end may be written in Electron. In some embodiments, the API or any other APIs may be written in Python or any other similar language. In some embodiments, an analyst may need to be authenticated before interacting with alert manager 104. In some embodiments, alert manager 104 may be a Django Rest Framework project. In some embodiments, an analyst may submit a work unit request using user interface 108, which is transmitted to alert manager 104 via the network. A work unit may be a shell or packet that operates within system 100; a work unit may have a unique ID assigned to it, may contain alert IDs, and may have an associated status (e.g. ready, pending, done). In some embodiments, a unique ID may include alphanumeric characters and be a certain length such that it cannot be easily replicated. A work unit may be a medium in which analysts may "check out" alerts to work on. The work unit request may include a strategy or criteria specified by the analyst for the inclusion of alerts and a desired number of alerts. An analyst may submit a work unit request that may include a desired strategy for assigning alerts based on time, severity, enterprise, or any others that may be described in this disclosure. For example, an analyst may request a work unit to be populated with fifty alerts of critical severity from Company A.

In response to receiving a work unit request, alert manager 104 may generate a new work unit and assign it a unique ID or token. Alert manager 104 may send the work unit ID back to user device 102 for re-use by the analyst. Alert manager 104 may transmit the newly generated work unit to work unit queue 112. In some embodiments, work unit queue 112 may be a queueing service that queues work units to send to work unit fulfiller 114. Work unit queue 112 may be configured to buffer or smooth workflows and decouple heavy processing by only allowing independent "blocks" through at a time (i.e. work units). In some embodiments, this may improve performance and scalability and prevent duplicate assignments. Work unit fulfiller 114 may receive work units (empty work units) as they are queued for sending by the work unit queue 112. In the context of the present disclosure, the queueing services may have the benefit of providing lag times to prevent over-assignment or double assignment of alerts to work units. Work unit fulfiller 114 may be configured to populate received work units with alerts based on the strategy (originally specified by the analyst in the work unit request) included with the work unit. In some embodiments, work unit fulfiller 114 may obtain alerts by directly accessing the alert database 106 or by communicating through alert manager 104. In some embodiments, populating a work unit may include populating the work unit with the alert IDs of each selected alert, or assigning the work unit ID to each alert ID. In some embodiments, once the alerts have been selected and assigned to a work unit (i.e. the work unit has been populated), the status of the work unit may be changed from pending to ready. In some embodiments, alert manager 104 may update each alert that has been assigned to a work unit with the ID of the respective work unit. An alert with a work unit ID assigned to it may not be assigned to a separate work unit. In other words, the alert may be "checked out." In some embodiments, alert manager 104 may change the alert status of each alert added to the work unit to "taken". Other statuses may include "new", "done", or "error".

In some embodiments, an analyst may need to manually check in with the system and query the received work unit ID to determine when the work unit state has been changed to ready and the work unit has been populated with alerts (or alert IDs corresponding to alerts). Once the work unit has been populated and the status has been changed to "ready", alert manager 104 may be configured to transmit the work unit, which includes the list of alert IDs of the alerts selected for the work unit, back to user device 102 and may cause the work unit to be displayed on user interface 108. The analyst may now access the alert database and query by alert ID to obtain alerts to work on. In some embodiments, when an analyst has completed work on an alert from their work unit, they may change the status of the alert to check it back in. In some embodiments, this may allow the alert to be allocated to another work unit in response to future requests for work units. In some embodiments, an analyst may change the work unit status to "done", and this would cause the status of every alert within the work unit to also be changed to "done."

In some embodiments, work unit fulfiller 114 may be configured to reclaim work units, or automatically check back in work units that have been checked out above a threshold amount of time. Work unit fulfiller 114 may be configured to clear every work unit token ID field associated with each alert (i.e. check back in and unassigned them from the currently assigned work unit) and change the state of the work unit to "reclaimed".

Figure 2:
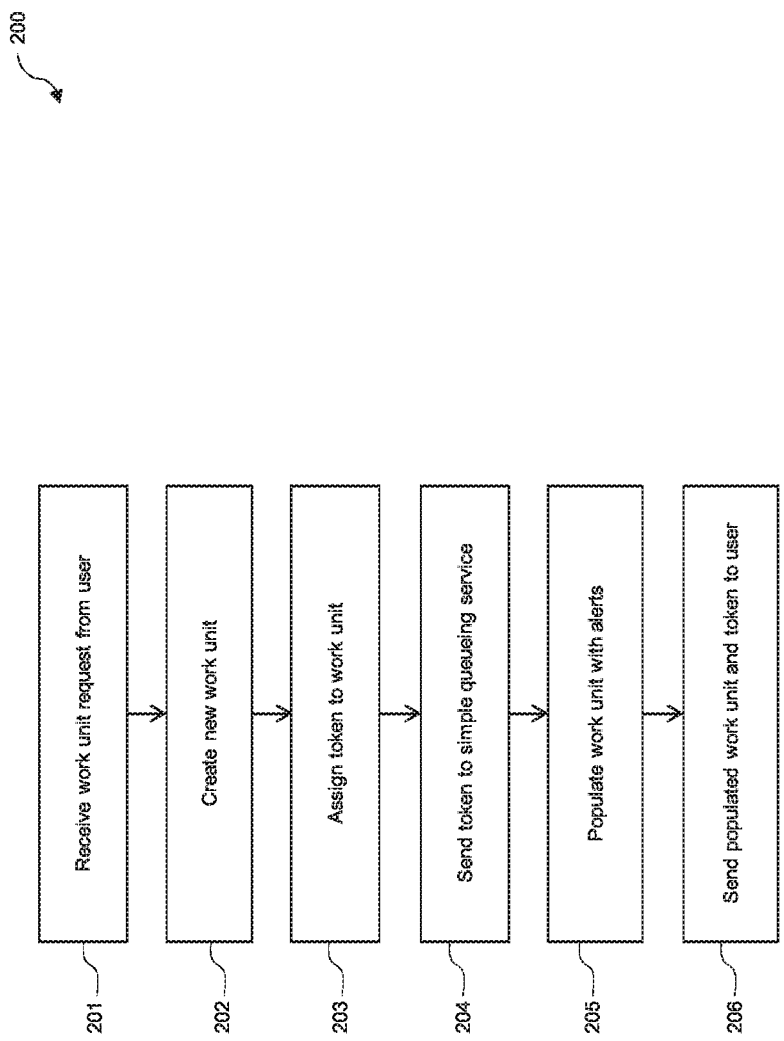
FIG. 2 is a process for creating a work unit that may occur within the system of FIG. 1, according to some embodiments of the present disclosure.

FIG. 2 is a process 200 for creating a work unit that may occur within the system 100 of FIG. 1, according to some embodiments of the present disclosure. At block 201, alert manager 104 may receive a work unit request from user via user device 102. In some embodiments, the work unit request may be sent via an HTTPS protocol. In some embodiments, the work unit request may include a desired strategy for selecting alerts to for the work unit. The request may also include a desired number of alerts. At block 202, alert manager 104 may create a new work unit. A work unit may include a requested number of alerts, the strategy for picking alerts (time, severity, geographic location of alert, priority level of enterprise, enterprise, etc.), a unique token (described at block 203), and a current status (e.g. ready, pending, done). A work unit may also include fields or JSON blocks with strategy data. At block 203, alert manager 104 may assign a unique ID or token ID to the newly created work unit. At block 204, alert manager 104 may send the work unit token ID to a queueing service. In some embodiments, this may be work unit queue 112 of system 100. In some embodiments, alert manager 104 may also return the work unit token to the user for various uses and for their records. At block 205, work unit fulfiller 114 may populate the work unit with alerts. Further details of populating a work unit are described in relation to FIG. 3. At block 206, the populated work unit is transmitted to the user. Once the user receives a populated work unit, or a batch of "checked out" alerts, the user may begin to address or work on these alerts. Additional details on possible courses of action for the user in response to receiving a populated work unit are described in relation to FIGS. 4-6.

Figure 3:
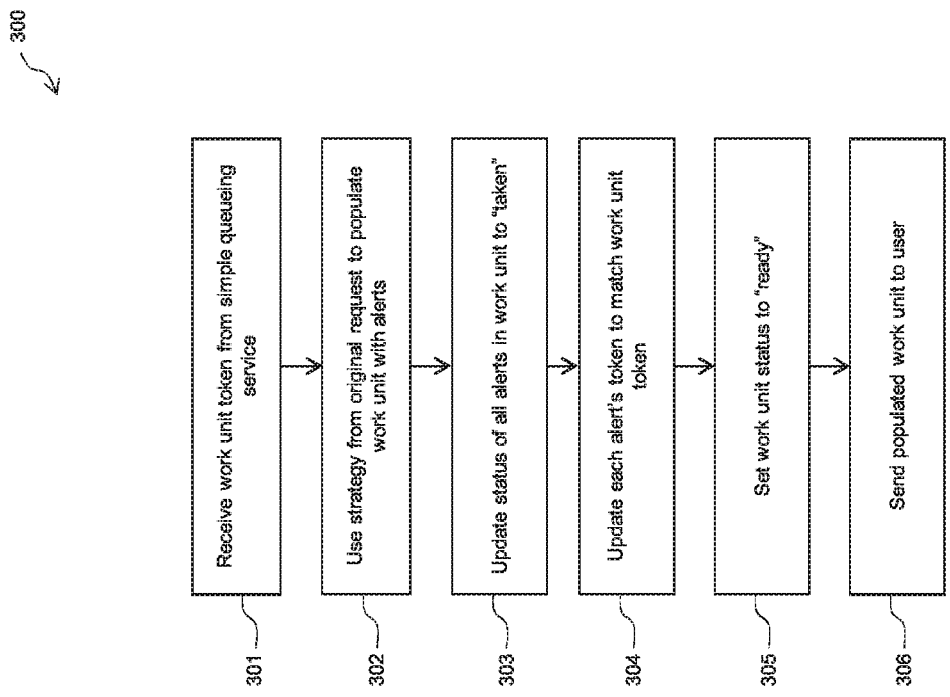
FIG. 3 is a process for populating a work unit with alerts that may occur within the system of FIG. 1, according to some embodiments of the present disclosure.

FIG. 3 is a process 300 for populating a work unit with alerts that may occur within the system 100 of FIG. 1, according to some embodiments of the present disclosure. In some embodiments, process 400 may correspond to block 205 of process 200. At block 301, work unit fulfiller 114 receives the token ID from the queueing service. In some embodiments, the queueing service may be work unit queue 112. At block 302, work unit fulfiller 114 may use the strategy from the original work unit request to populate the work unit with alerts. In some embodiments, work unit fulfiller 114 may use the metadata included with the work unit (requested strategy, requested number, etc.) to select alerts. The alert IDs for each selected alert may be added to the work unit. Work unit fulfiller may also only select alerts that have a status of "new" and are not currently assigned to another work unit token. At block 303, work unit fulfiller 303 may update the status of all alerts that were assigned to the work unit to "taken". This may ensure the alert is actually "checked out", so work unit requests by other users will not have this alert assigned to them. At block 304, work unit fulfiller 114 may update a field of the alert corresponding to its currently assigned work unit to the work unit token ID. This may help improve security by creating an authentication or verification step before allowing users to update alert statuses after having worked on them. Only users with work unit tokens that match alert tokens may update alert statuses. The alert may also be updated with the time at which it was "checked out". At block 305, work unit fulfiller 305 may set the work unit status to "ready". In response to block 305, work unit fulfiller 114 may send the populated work unit to alert manager 104 and then to user device 102. The populated work unit may include a list of alert IDs corresponding to alerts selected based on the originally specified strategy of the user. The alerts contained in the work unit are now "checked out" by the user.

Figure 4:
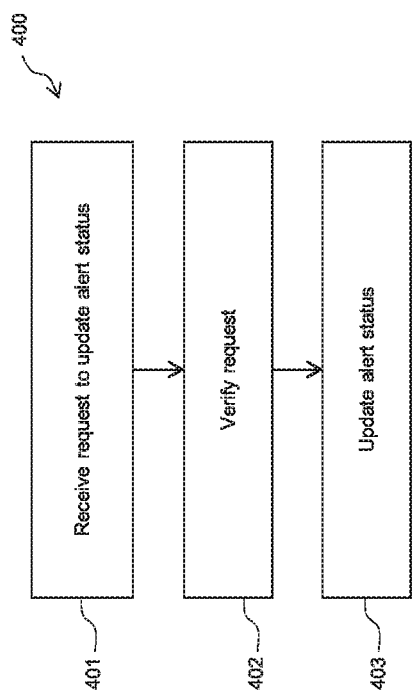
FIG. 4 is a process for updating the status of an alert that may occur within the system of FIG. 1, according to some embodiments of the present disclosure.

FIG. 4 is a process 400 for updating the status of an alert that may occur within the system of FIG. 1, according to some embodiments of the present disclosure. In some embodiments, process 400 may be performed by alert manager 104 of system 100. In some embodiments, process 400 may occur after an analyst has worked on an alert that they have checked out with their work unit. For example, an analyst may have an alert in their work unit corresponding to a detected violent tweet within the vicinity of a school on behalf of that school. The analyst may choose to escalate the situation to deal with the alert, and mark the alert with information indicating such actions. Because this alert has been dealt with/managed/triaged, the analyst may now wish to update its status. At block 401, alert manager 104 may receive a request to update an alert status from user device 102. A user or analyst may submit this request via user interface 108 of user device 102. In some embodiments, the request may include the alert ID and the respective work unit token. At block 402, alert manager 104 may verify the request. In some embodiments, this may include checking whether the supplied work unit token corresponds to the alert, as a security measure. If the work unit token does not match, an error is returned. In response to detecting a match, at block 403, the user or analyst, via user device 102, may update the status of the alert. In some embodiments, this may include changing the status from "taken" (i.e. assigned to a work unit or "checked out") to "done" (i.e. work completed) or "error".

Figure 5:
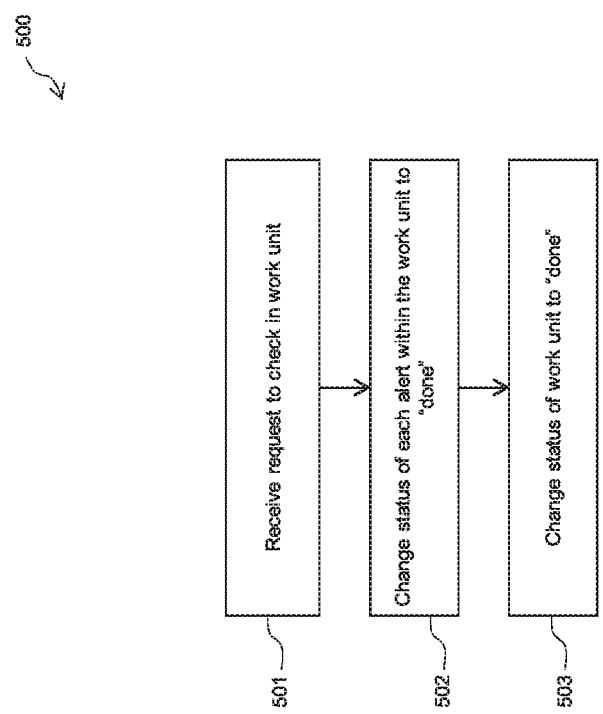
FIG. 5 is a process for checking in a work unit that may occur within the system of FIG. 1, according to some embodiments of the present disclosure.

FIG. 5 is a process 500 for checking in a work unit that may occur within the system 100 of FIG. 1, according to some embodiments of the present disclosure. At block 501, alert manager 104 may receive a request to check in a work unit. In some embodiments, the request may include a work unit token ID. At block 502, alert manager 104 may change the status of each alert within the respective work unit to "done", thereby "checking in" these alerts. Alert manager 104 may also change the field of each alert that indicated the work unit it was assigned to be blank (i.e. erase the work unit token ID that was assigned to the alert). This may allow the alert to be checked out again and assigned to a different work unit in the future. At block 503, alert manager 104 may change the status of the work unit to "done". This may indicate that the work unit is checked in, as well.

Figure 6:
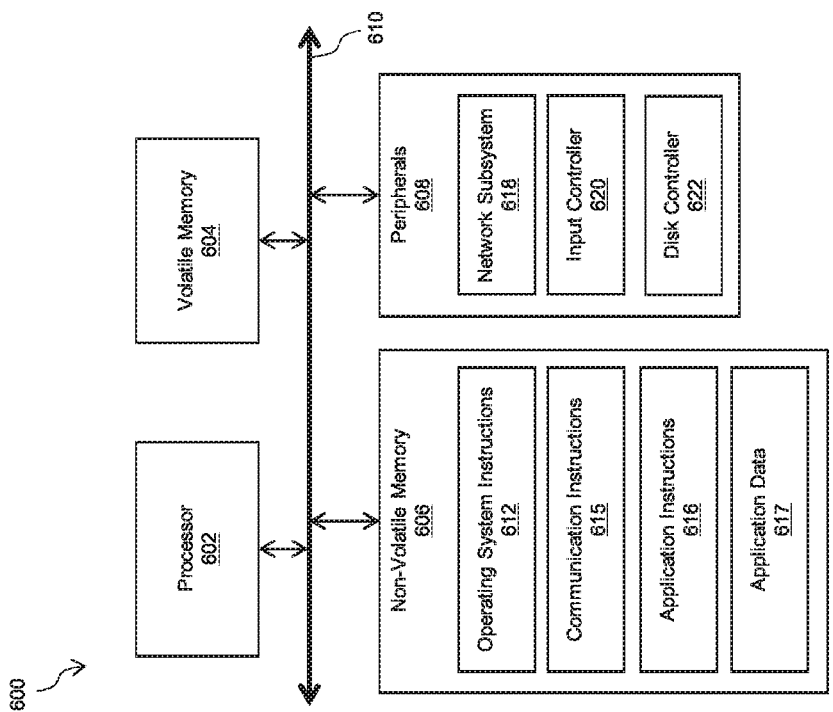
FIG. 6 is an example processing device, according to some embodiments of the present disclosure.

FIG. 6 is an example processing device 600, according to some embodiments of the present disclosure. In some embodiments, server device 600 may include at least one module corresponding to filter 110, alert manager 104, work unit queue 112, and work unit fulfiller 114. In some embodiments, server device 600 may be a virtual server device, such as an Elastic Compute Cloud (EC2) instance of spot instance within Amazon Web Services. Server device 600 may implement various features and processes as described herein. Server device 600 may be implemented on any electronic device that runs software applications derived from complied instructions, including without limitation personal computers, servers, smart phones, media players, electronic tablets, game consoles, email devices, etc. In some implementations, server device 600 may include one or more processors 602, volatile memory 604, non-volatile memory 606, and one or more peripherals 608. These components may be interconnected by one or more computer buses 610.

Processor(s) 602 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 610 may be any known internal or external bus technology, including but not limited to ISA, EISA, PCI, PCI Express, NuBus, USB, Serial ATA, or FireWire. Volatile memory 604 may include, for example, SDRAM. Processor 602 may receive instructions and data from a read-only memory or a random access memory or both. The essential elements of a computer may include a processor for executing instructions and one or more memories for storing instructions and data.

Non-volatile memory 606 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 606 may store various computer instructions including operating system instructions 612, communication instructions 614, application instructions 616, and application data 617. Operating system instructions 612 may include instructions for implementing an operating system (e.g., Mac OS®, Windows®, or Linux). The operating system may be multi-user, multiprocessing, multitasking, multithreading, real-time, and the like. Communication instructions 614 may include network communications instructions, for example, software for implementing communication protocols, such as TCP/IP, HTTP, Ethernet, telephony, etc. Application instructions 616 can include instructions for managing a high volume workflow of tasks according to the systems and methods disclosed herein. For example, application instructions 616 may include instructions for components 110, 104, 112, and 114 described above in conjunction with FIG. 1.

Peripherals 608 may be included within server device 600 or operatively coupled to communicate with server device 600. Peripherals 608 may include, for example, network subsystem 618, input controller 620, and disk controller 622. Network subsystem 618 may include, for example, an Ethernet of WiFi adapter. Input controller 620 may be any known input device technology, including but not limited to a keyboard (including a virtual keyboard), mouse, track ball, and touch-sensitive pad or display. Disk controller 622 may include one or more mass storage devices for storing data files; such devices include magnetic disks, such as internal hard disks and removable disks; magneto-optical disks; and optical disks.

The graphical user interfaces 700-1200 of FIGS. 7-12 may be accessed by an analyst on a user device 102 within the context of system 100 and allow the analyst to interact with alert manager 104 and other components.

Figure 7:
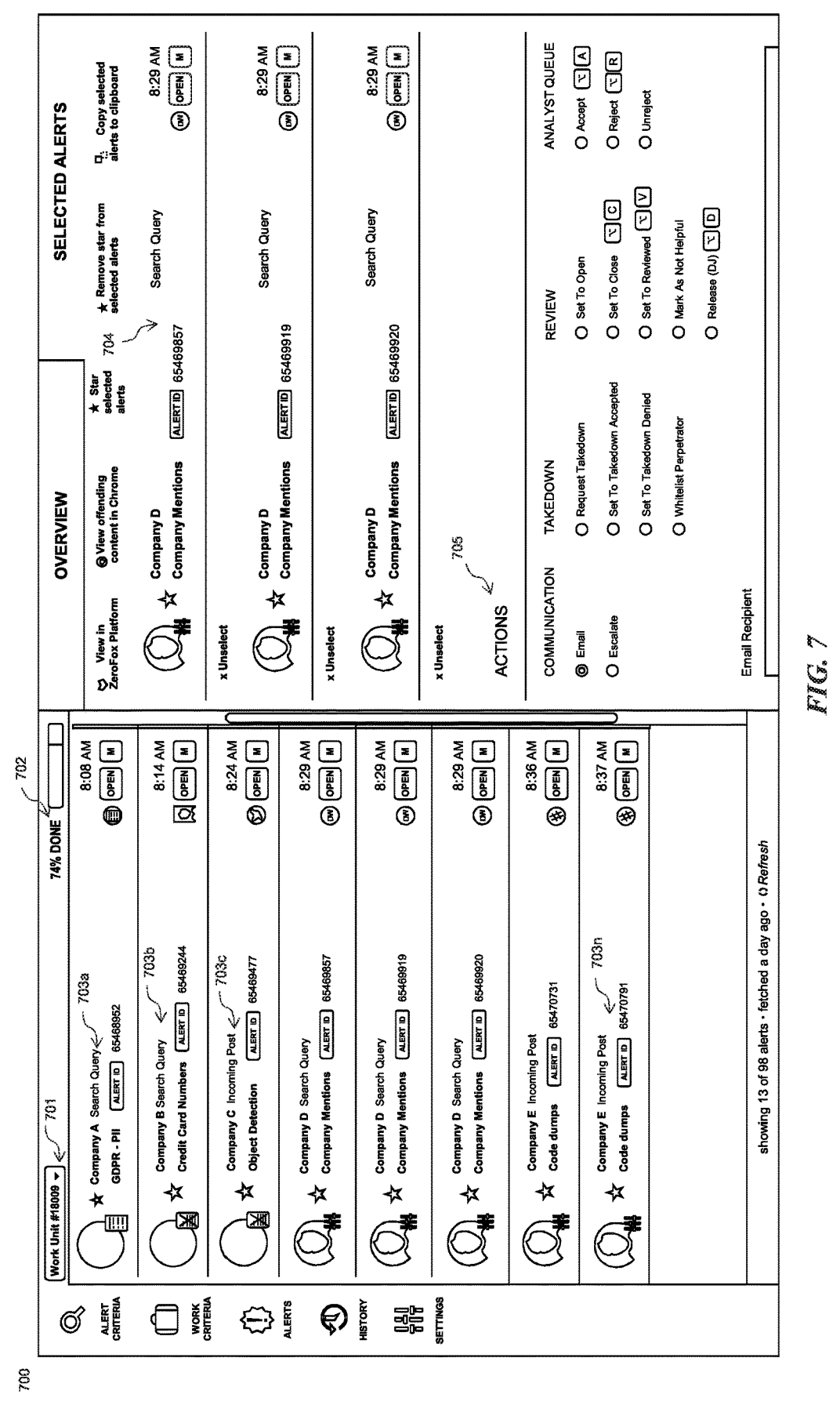

FIG. 7 is an example graphical user interface (GUI) 700 showing a list of alerts within a work unit, according to some embodiments of the present disclosure. GUI 700 includes a list of alerts 703a-n (703 generally) assigned to a work unit 701. Work unit 701 is defined by a unique token ID #18009. Each alert 703 includes a time of creation, the associated enterprise, an alert ID, a status, an indication of what triggered the alert, and an indication of the source of the alert. For example, alert 703c is an alert created at 8:24 am on behalf of Company C (enterprise), with an alert ID of 65469477. The alert 703c was detected as a tweet and it was triggered by detection of an object (e.g. a knife, credit card, etc.). GUI 700 also has a list 704 of alerts selected by the user. A list of actions 705 that may be taken by the analyst may also be included. Examples actions may include communication (email notification or escalation), takedown (requesting a takedown, set to takedown accepted, set to takedown denied, or whitelist perpetrator), indicators as a result of the analyst reviewing the alert (open, closed, reviewed, not helpful, or released), and an indication of the analyst's desired action in regards to their current queue (accept, reject, un-reject).

Figure 8:
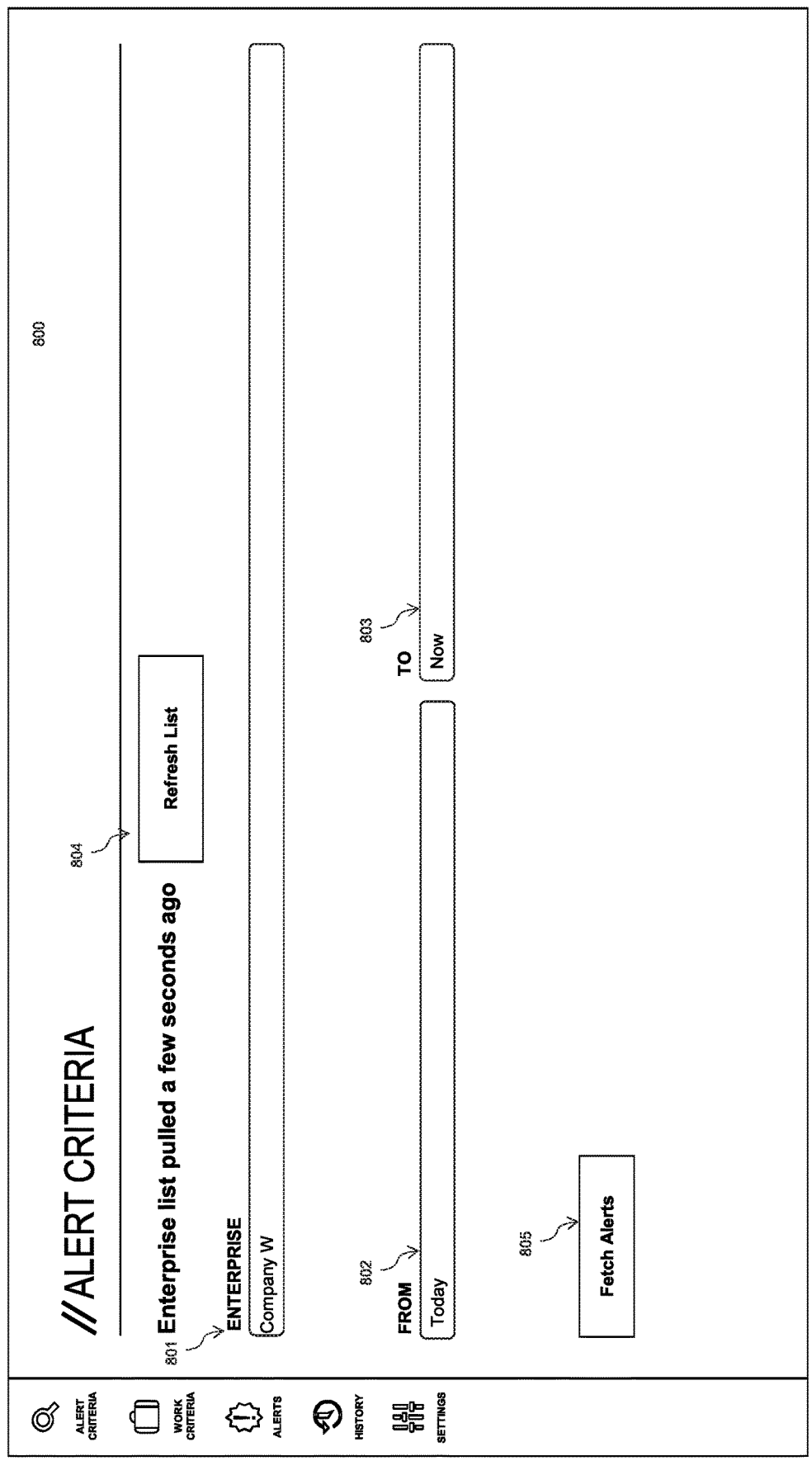
FIG. 8 is an example graphical user interface showing a fetch alerts functionality, according to some embodiments of the present disclosure.

FIG. 8 is an example graphical user interface (GUI) 800 showing a fetch alerts functionality, according to some embodiments of the present disclosure. GUI 800 may include fillable fields 801, 802, and 803 for a user to input information. Field 801 allows the user to input an enterprise (e.g. Company X). Fields 802 and 803 allow the user to specify a date range in which alerts should be fetched from. Button 804 may allow the user to refresh a list that has already been fetched, while button 805 may allow a user to fetch alerts in response to specifying different criteria.

Figure 9:
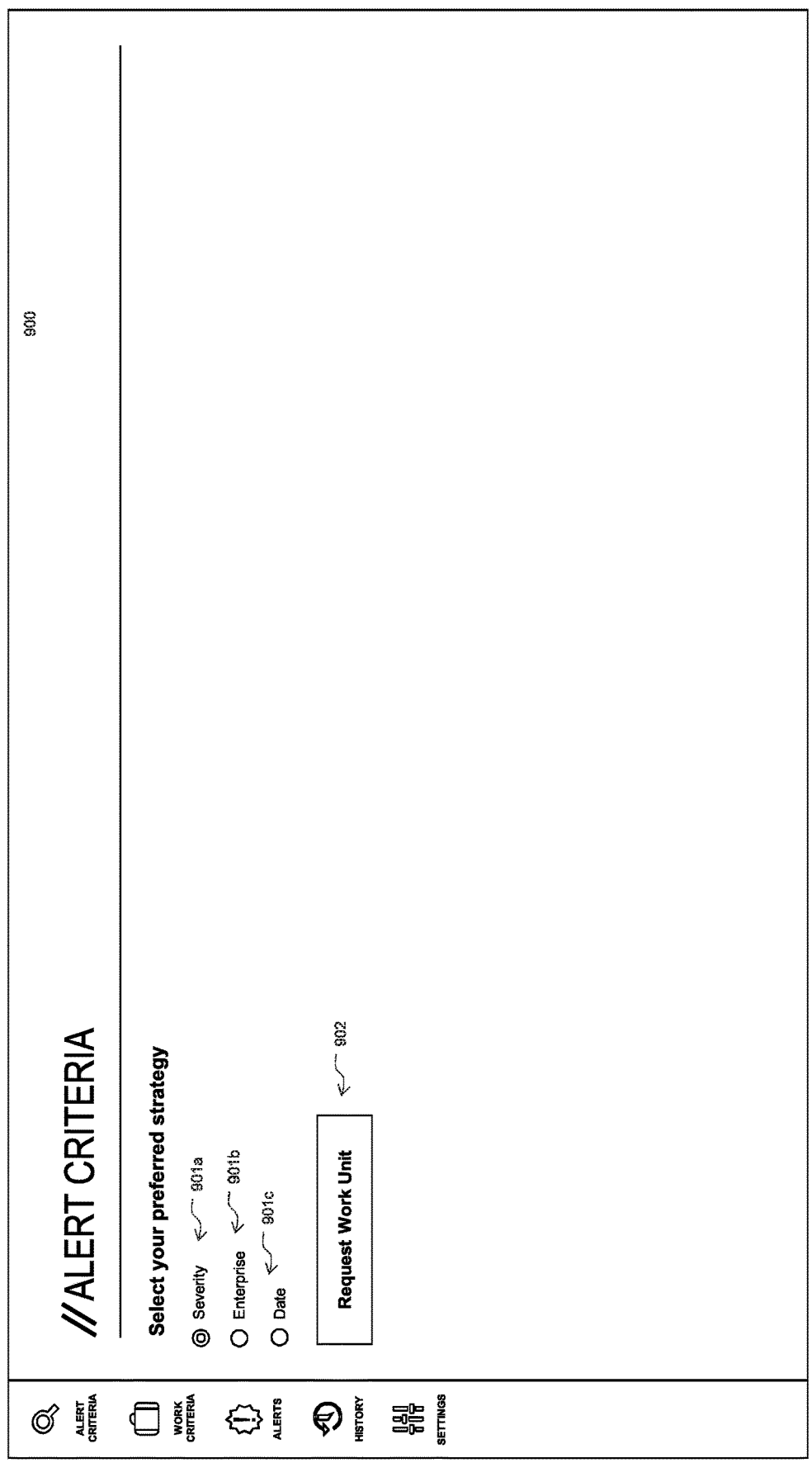
FIG. 9 is an example graphical user interface showing a request work unit functionality, according to some embodiments of the present disclosure.

FIG. 9 is an example graphical user interface (GUI) 900 showing a request work unit functionality, according to some embodiments of the present disclosure. GUI 900 may include three options for a preferred strategy on assigning alerts to a requested work unit: severity 901a, enterprise 901b, and date 901c, although other strategies may be employed. Other strategies may include, but are not limited to, the rule type that triggered the alert, the enterprise type (i.e. type of company or category of company, such as airlines), the policy type (i.e. plan or policy that a specific enterprise or company has chosen in order to monitor based on), specific social networks, and general data sources (i.e. domains, incoming emails on email accounts, etc.). In some embodiments, more than one strategy may be selected. GUI 900 may also include a button 902 to initiate a work unit request. With respect to system 100 of FIG. 1, this may cause a work unit request to be transmitted to alert manager 104 from user device 102. This may also trigger process 200 of FIG. 2.

FIG. 10 is an example graphical user interface (GUI) 1000 showing work unit data, according to some embodiments of the present disclosure. GUI 1000 may include a button 1001 for refreshing the data or work status of an analyst's list of work units. The work unit list of GUI 1000 may include any number of work unit items. Work unit 1002 is described by its assigned token ID (18009), a creation time 1003 (2 hours ago), contact information 1004 for the creator of the work unit, the strategy 1005 that was used to populate the work unit, the progress 1006 of the work unit (i.e. number of alerts that have been marked "done"), the status 1007 of the work unit ("ready"), and a button 1008 which, when pressed by an analyst, may release or "check back in" the work unit.

FIG. 11 is an example graphical user interface (GUI) 1100 showing an overview of a work unit, according to some embodiments of the present disclosure. GUI 1100 may include a list 1101 of alerts within a work unit 18009; this may be the same list of alerts and same work unit as in FIG. 7. The overview in GUI 1100 may also include filters 1102 to sift through alerts of the work unit. For example, an analyst may filter by "taken" status and "open" status. GUI 1100 may include various demographic data on the alerts within the work unit, such as list 1103 showing percentages/numbers of un-escalated vs. escalated alerts, list 1104 showing percentages/numbers of reviewed vs. un-reviewed alerts, list 1105 showing percentages/numbers of alerts with/without entity labels (i.e. notes about a protected entity, such as a specific brand), list 1106 showing percentages/numbers of alerts with/without tags, and a list 1107 showing percentages/numbers of alerts with/without notes. In some embodiments, examples of tags may be tags that indicate if an alert has/does not have a profile picture or where the confidence level of the machine learning algorithm that originally created the alert (e.g. the rule engine of application Ser. No. 16/570,081, applying machine learning models to detect events and create alert) is above a certain threshold (i.e. 80% confident that a gun has been detected in an image or 90% confident that a domain or email is a phishing scam) GUI 1100 may also include a list 1108 of all different enterprises included with the work unit. In some embodiments, an alert may be starred (i.e. pinned) by a user to manually group alerts.

Figure 12:
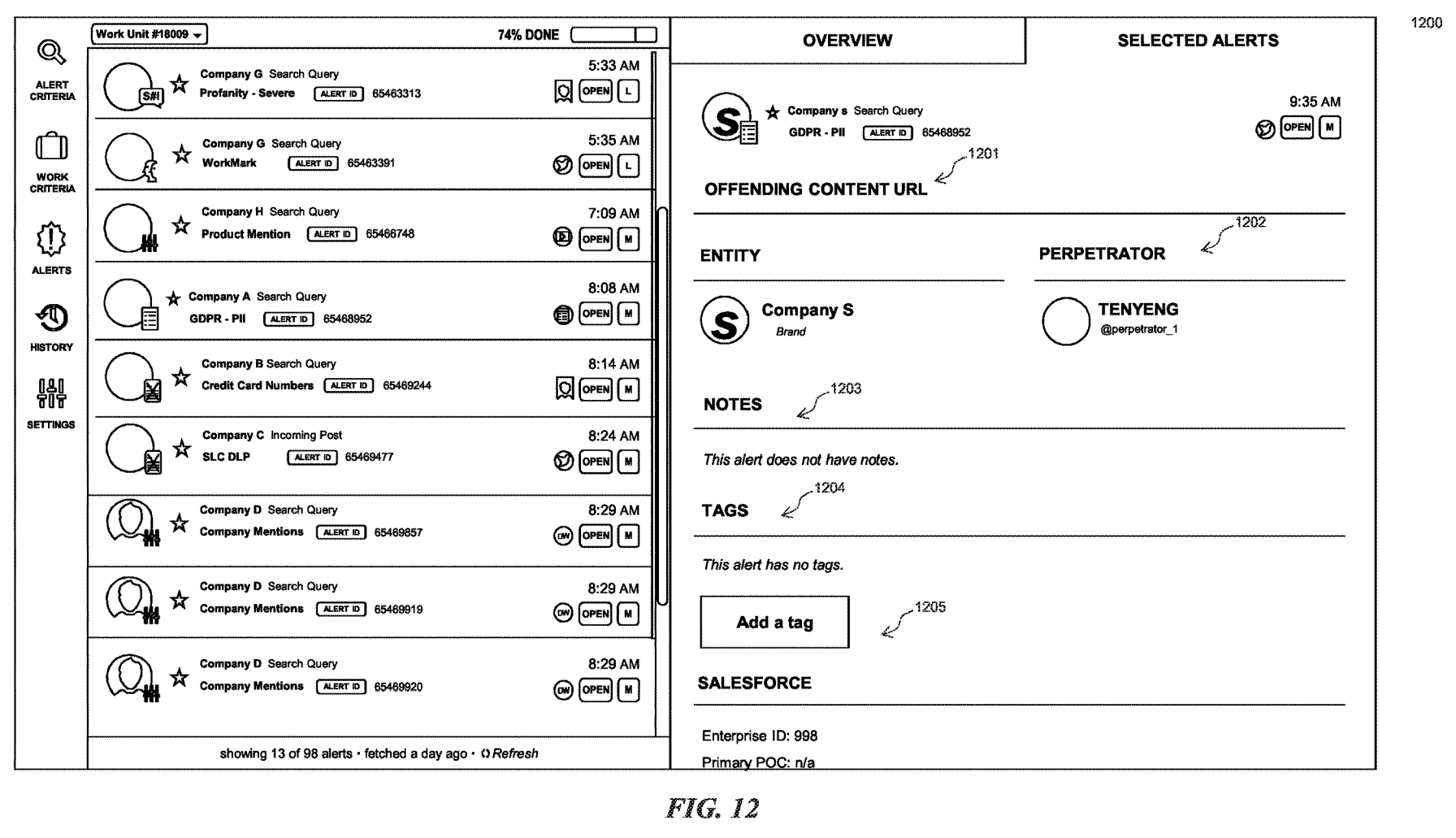

FIG. 12 is an example graphical user interface (GUI) 1200 showing a selected alert within a work unit, according to some embodiments of the present disclosure. GUI 1200 may include an alert (alert ID 65472939) with various information displayed about the alert Similar to in list view, GUI 1200 includes the enterprise and enterprise ID, time of creation, and the platform from which is originated (i.e. Twitter). GUI 1200 may also include an offending content URL 1201, an identity of the perpetrator (i.e. poster) 1202, notes 1203 added by analysts, tags 1204 added by analysts, and a button 1205 that may allow an analyst to add a tag. In some embodiments, the selected alert in FIG. 12 may be referred to as a hydrated alert. In the context of a user receiving a populated work unit, the populated work unit will include a list of alert IDs. While this technically implies the work unit includes the alert, the alerts as included in a populated work unit may be referred to as a dehydrated alert. A dehydrated alert may include simple fields such as the alert ID, enterprise ID, rule ID, policy ID, or network. A hydrated alert may include notes, comments, login activity, history or historical changes in severity or status. In the context of the present disclosure, and FIG. 12 as an example, an analyst or user may select an alert within their work unit and input notes or comments or other additional details. This may constitute "hydrating" an alert, or creating a hydrated alert. Naturally, a hydrated alert may provide more context and information to an analyst viewing the alert. In the context of FIGS. 1-5, dehydrated alerts are preferably used, as a dehydrated alert will naturally offer a simpler schema, benefitting time constraints and processing efficiency. In some embodiments, the hydrated alerts may be stored in the alert database 106 of FIG. 1. When a user selects an alert to view from their work unit, alert manager 104 may extract the hydrated alert from alert database 106 and cause it to be displayed on the user device 102.

In some embodiments, there may also be checks in place to prevent an alert from consistently giving errors. After a user receives a populated work unit of dehydrated alerts (i.e. the work unit token ID with a list of alert IDs assigned to it), the user may submit a request to hydrate all alerts within the work unit. After receiving the request, the alert manager 104 may query the alert database 106 by alert ID and return each alert as a hydrated alert to the user. In the case that the alert manager 104 was, for any reason, not able to return a hydrated alert for a particular alert ID, the user receives an "error" for that alert ID. The user may then update the error count associated with the alert ID. In some embodiments, if the error count associated with an alert ID surpasses a certain threshold, the alert will no longer be considered for scheduling and may be ignored when populating work units.

Methods described herein may represent processing that occurs within a system for enriching data (e.g., process 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing illustrative embodiments, it is understood that the present disclosure has been made only by way of example, and that numerous changes in the details of implementation of the disclosed subject matter may be made without departing from the spirit and scope of the disclosed subject matter.

The invention claimed is:

1. A system for managing a workflow of tasks comprising:
a database configured to store a plurality of tasks, each task having a unique task ID, a date, a severity level, an enterprise ID, a status, and an assignment field;
a user device;
one or more processors; and
a server configured for execution by the one or more processors to:
receive a work unit request from the user device, the request comprising a strategy for selecting tasks based on at least one of, the date, the enterprise ID, a source of a task, or a confidence level of a machine learning model that created the task;
create a work unit, the work unit having a state indicator, the work unit being a shell or packet that operates within the system;
assign a unique token ID to the work unit;
add, via a queueing service, the work unit to a work unit queue comprising a plurality of other work units, wherein the queueing service provides lag times associated with the plurality of other work units and a buffer between the plurality of other work units in the work unit queue,
wherein the work unit is accessed by the server independently from the plurality of other work units, and wherein the buffer and the lag times are used to prevent duplicate assignment of alerts to work units;
select at least one task from the plurality of tasks in the database based on the strategy;
add the task ID for the at least one selected task to the work unit to create a populated work unit;
change the status of the at least one selected task to indicate the at least one task is checked out only when the user device is authenticated, wherein the user device is authenticated when a work unit token associated with the user device matches the token ID;
insert the token ID into the assignment field;
send the populated work unit to the user device; and
change the state indicator to indicate the work unit is checked out.

2. The system of claim 1, wherein the server is further configured to:
receive work unit requests from a plurality of user devices;
create work units for the received work unit requests;
populate a work unit after the work unit is released from the queueing service; and
send the populated work unit to a user device of the plurality of user devices.

3. The system of claim 1, wherein the server is further configured to:
receive a plurality of tasks from a notification service; and
store the received plurality of tasks in the database.

4. The system of claim 1, wherein the server is further configured to:

authenticate a user associated with the user device prior to receiving the work unit request.

5. The system of claim 1, wherein the server is further configured to:
in response to changing the state indicator of a work unit to indicate the work unit is checked out, record a time of checking out;
monitor a duration of time since the time of checking out;
determine the duration of time has passed a threshold length; and
in response to determining the duration of time has passed the threshold length, change the state indicator to indicate the work unit is checked in.

6. The system of claim 5, wherein the server is further configured to, in response to determining the duration of time has passed a threshold length, change the status of the at least one selected task to indicate the at least one selected task is checked in.

7. The system of claim 1, wherein the server is further configured to:
receive a request to update the status of a checked out task from the user device;
verify that the request includes a token ID corresponding to the assignment field of the checked out task;
receive a new status from the user device; and
update the status of the checked out task with the new status.

8. The system of claim 1, further comprising:
a first HTTPS connection between the user device and the server; and
a second HTTPS connection between the server and the database.

9. The system of claim 1, wherein the strategy for selecting tasks further comprises at least one of:
selecting a pre-defined amount of tasks; or
selecting based on a rule type that created the task.

10. The system of claim 9, wherein selecting at least one task form the plurality of tasks in the database comprises:
selecting by at least one of enterprise ID or severity level; and
adding the task IDs of the at least one selected task in an order sorted by date.

11. The system of claim 1, wherein the server is further configured to ignore tasks in the database with a checked out status while populating the work unit.

12. The system of claim 1, wherein the server is further configured to:
receive a request to check in a work unit from the user device;
change the status of each task assigned to the work unit to indicate each task is checked in; and
change the state indicator of the work unit to indicate the work unit is checked in.

13. A method for managing a workflow of tasks comprising:
receiving, by a server, tasks from a notification service;
storing, by the server, the tasks in a database, wherein each task has a unique task ID, a status, and an age;
receiving, by the server, a first work unit request from a first user device, the request comprising a first strategy and a desired number of tasks, the first strategy being based on at least one of, the age, an enterprise ID, a source of a task, or a confidence level of a machine learning model that created the task;
creating, by the server, a first work unit, the work unit being a shell or packet that operates within the server;
generating a first unique token ID;
assigning, by the server, the first unique token ID to the first work unit;
adding, via a queueing service, the work unit to a work unit queue comprising a plurality of other work units, wherein the queueing service provides lag times associated with the plurality of other work units and a buffer between the plurality of other work units in the work unit queue
wherein the work unit is accessed by the server independently from the plurality of other work units, and wherein the buffer and the lag times are used to prevent duplicate assignment of alerts to work units;
selecting, by the server, the desired number of tasks from the database based on the first strategy and based on the age of tasks, wherein the selected tasks are the oldest tasks in the database that correspond to the first strategy;
adding, by the server, the task ID of each task of the first plurality of tasks to the first work unit;
sending, by the server, the first work unit to the first user device; and
changing, by the server, the status of each task of the first plurality of tasks to indicate each task is checked out only when the user device is authenticated, wherein the user device is authenticated when a work unit token associated with the user device matches the token ID.

14. The method of claim 13, further comprising:
receiving, by the server a second work unit request from a second user device, the request comprising a second strategy;
creating, by the server, a second work unit;
generating a second unique token ID;
assigning, by the server, the second unique token ID to the second work unit;
selecting, by the server, a second plurality of tasks from the database based on the second strategy, wherein the first and second plurality of tasks have no overlapping tasks; and
adding, by the server, the task ID of each task of the second plurality of tasks to the second work unit.

15. The method of claim 14, further comprising:
sending, by the server, the second work unit to the second user device; and
changing, by the server, the status of each task of the second plurality of tasks to indicate each task is checked out.

16. The method of claim 13, further comprising authenticating, by the server, a user of the user device prior to receiving the first work unit request.

17. A method for managing a workflow comprising:
receiving, by a server, a plurality of work unit requests from a plurality of user devices, wherein each work unit request comprises a strategy for selecting tasks based on at least one of, a date, an enterprise ID, a source of a task, or a confidence level of a machine learning model that created the task;
creating, by the server, a plurality of work units, the work units being shells or packets that operate within the server;
generating, by the server, a unique token ID for each work unit;
assigning, by the server, the unique token ID to the corresponding work unit;
queueing, by a queueing service, the plurality of work units, wherein queueing the plurality of work units comprises allowing one of the plurality of work units to be accessed by the server independently, wherein the queueing service provides lag times associated with the plurality of other work units and a buffer between the plurality of other work units in the work unit queue, and wherein the buffer and the lag times are used to prevent duplicate assignment of alerts to work units;

in response to queueing the plurality of work units, selecting, one work unit at a time, by the server, a first plurality of alerts from a database of stored alerts by analyzing the database based on the strategy of the one work unit, wherein each stored alert comprises an alert ID;

assigning, by the server, the alert ID of each selected alert to the one work unit;

marking, by the server, each selected alert with the unique token ID of the one work unit;

sending, by the server, the one work unit to the user device from where it was received; and changing, by the server, a status of at least one task to indicate the at least one task is checked out only when the user device is authenticated, wherein the user device is authenticated when a work unit token associated with the user device matches the unique token ID.

18. The method of claim 17, further comprising:

in response to marking each selected alert with the unique token ID of the one work unit, selecting, by the server, a second plurality of alerts for a subsequent work unit from the queueing service;

assigning, by the server, the alert ID of each of the second plurality of alerts to the subsequent work unit;

marking, by the server, each of the second plurality of alerts with the unique token ID of the subsequent work unit; and in response to receiving a query from a user device corresponding to the subsequent work unit, sending the subsequent work unit to the corresponding user device.

19. The method of claim 18, further comprising:

causing, by the server, functionality to be displayed on the corresponding user device that allows a user of the corresponding user device to:

view the alert IDs within the subsequent work unit;

extract alerts from the database by alert ID;

update a status of an alert within the subsequent work unit; and check in the subsequent work unit.

20. The method of claim 19, wherein the functionality allows the user of the corresponding user device to:

view a confidence level of an alert within the subsequent work unit associated with a rule that triggered detection of the alert; and attach a tag to the alert, wherein the tag indicates at least one of:

whether the confidence level surpasses a threshold confidence level; or whether the alert has a profile picture.

\* \* \* \* \*